United States Patent [19]
Abe et al.

[11] Patent Number: 5,084,424
[45] Date of Patent: Jan. 28, 1992

[54] CERAMIC DIELECTRICS AND COMPOSITIONS THEREFOR

[75] Inventors: Kazunobu Abe; Masashi Aoki; Kazuhisa Hidaka, all of Sakai, Japan

[73] Assignee: Sakai Chemical Industry Co., Ltd., Osaka, Japan

[21] Appl. No.: 641,793

[22] Filed: Jan. 16, 1991

Related U.S. Application Data

[63] Continuation of Ser. No. 350,035, May 10, 1989, abandoned.

[30] Foreign Application Priority Data

| May 11, 1988 | [JP] | Japan | 63-115629 |
| Dec. 9, 1988 | [JP] | Japan | 63-312715 |
| Dec. 9, 1988 | [JP] | Japan | 63-312716 |

[51] Int. Cl.$^5$ ............................................. C04B 35/46
[52] U.S. Cl. ................................. 501/137; 501/138; 423/598
[58] Field of Search ............ 501/137, 138, 139; 252/62.9; 423/598

[56] References Cited

U.S. PATENT DOCUMENTS

| 4,643,984 | 2/1987 | Abe et al. | 501/134 |
| 4,677,083 | 6/1987 | Uedaira et al. | 501/136 |
| 4,764,494 | 8/1988 | Sakabe et al. | 501/136 |
| 4,767,732 | 8/1988 | Furukawa et al. | 501/136 |

FOREIGN PATENT DOCUMENTS 0258944 4/1986 European Pat. Off. .
8808830 11/1988 PCT Int'l Appl. .

OTHER PUBLICATIONS

*Elektronik Gera* Dielectric Ceramic, Koehler et al. 1985 "Chem. Abstracts".

Primary Examiner—William R. Dixon, Jr.
Assistant Examiner—Paul Marcantoni
Attorney, Agent, or Firm—Wenderoth, Lind & Ponack

[57] ABSTRACT

A composition for producing ceramic dielectrics which comprises: a mixture of barium titanate which has average particle size of 0.1–1.5 μm is amounts of 98–60 mole % and a perovskite type barium titanate solid solution which has average particle size of 0.1–1.5 μm and a Curie temperature of 50°–115° C. in amounts of 2–40 mole %; and (A) at least one of niobium oxides and tantalum oxides in amounts of 0.3–2 moles % in relation to 100 mole % of the mixture; and (B) at least one of cobalt oxides, nickel oxides, magnesium oxides, manganese oxides, copper oxides and oxides of a rare earth metal in amounts of 0.1–2 moles % in relation to 100 mole % of the mixture.

The composition provides a ceramic dielectric which has a large relative permittivity and still has a small temperature dependence of relative permittivity within ±15% over a temperature range between −55° C. and +125° C. taking a relative permittivity at 20° C. as a standard.

4 Claims, 15 Drawing Sheets

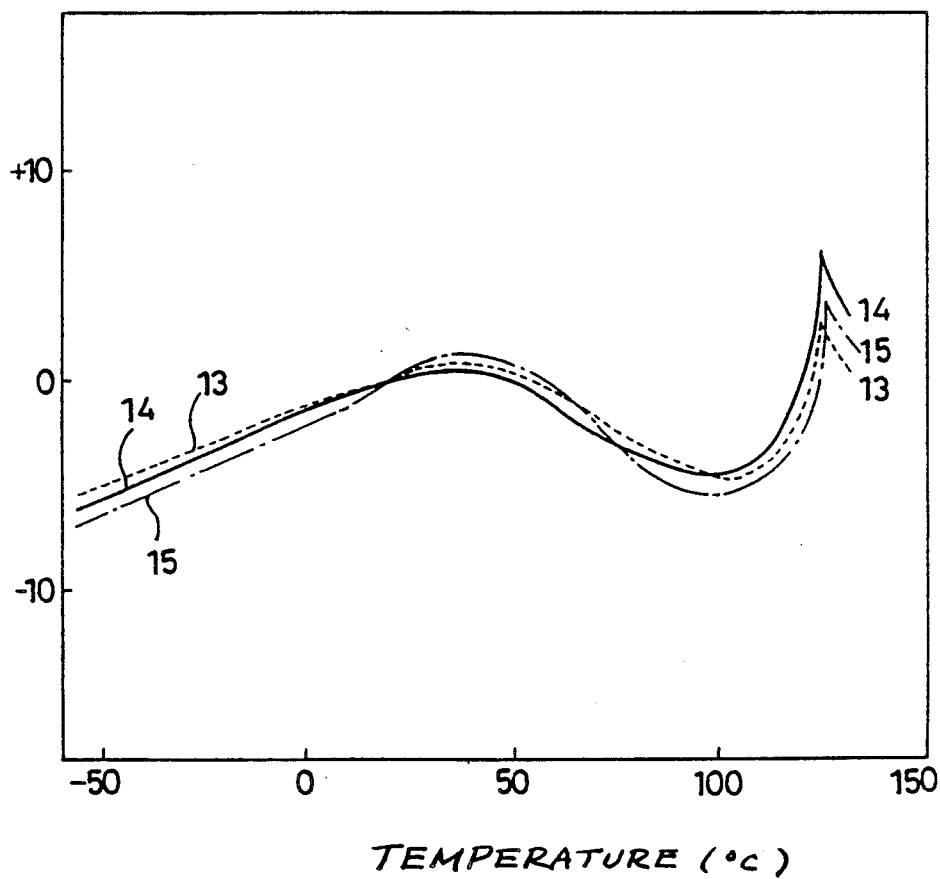

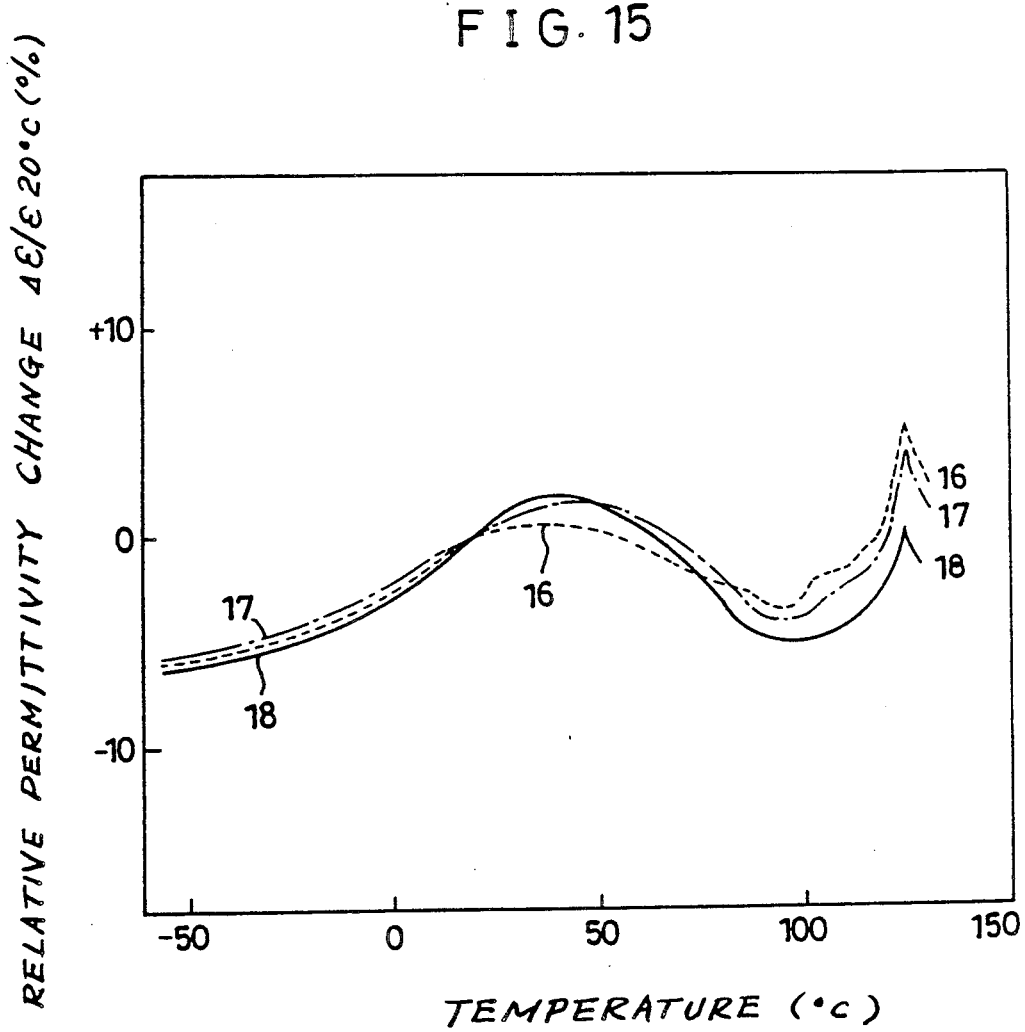

CERAMIC DIELECTRICS AND COMPOSITIONS THEREFOR

This application is a continuation of now abandoned application Ser. No. 07/350,035 filed on May 10, 1989, now abandoned.

This invention relates to ceramic dielectrics and compositions for producing the same. More particularly, the invention relates to ceramic dielectrics which have a high relative permittivity and a very small variation in relative permittivity within ±15% over a wide temperature range between −55° C. and +125° C. taking a relative permittivity at 20° C. as a standard, compositions for producing such ceramic dielectrics, and methods of producing the same using the composition.

Ceramic dielectrics produced by sintering barium titanate are well known. Since the relative permittivity of these ceramic dielectrics vary over a wide range depending upon ambient temperature, a method is known wherein barium titanate is mixed with small amounts of cobalt oxides or niobium oxides, and the mixture is sintered to diffuse the oxides into the barium titanate in a controlled manner, as described in Electrocomponent Science and Technology, Vol. 2, pp. 241-247 (1976).

However, such a ceramic dielectric still has a large negative variation in relative permittivity at temperatures of around 100° C. Therefore, it has been very difficult to produce in an industrially stable manner ceramic dielectrics which meet the requirements of U.S. X7R Standard that the variation in relative permittivity shall be within than ±15% taking a relative permittivity at 25° C. as a standard over a temperature range between −55° C. to +125° C. or the requirements of Japanese B Standard that the variation in relative permittivity shall be within ±10% taking a relative permittivity at 20° C. as a standard over a temperature range between −55° C. to +125° C.

It is, therefore, an object of the invention to obviate the above mentioned problem in the production of ceramic dielectrics mainly composed of barium titanate, and to provide a composition for producing such a ceramic dielectric which has a high relative permittivity and a small variation in relative permittivity within ±15% taking a relative permittivity at 20° C. as a standard over a temperature range between −55° C. to +125° C.

It is also an object of the invention to provide such a ceramic dielectric as above described.

It is still an object of the invention to provide a method of producing such a ceramic dielectric as above described.

There is provided in accordance with the invention a composition for producing a ceramic dielectric which comprises: a mixture of barium titanate which has average particle size of 0.1-1.5 μm in amounts of 98-60 mole % and a perovskite type barium titanate solid solution which has average particle size of 0.1-1.5 μm and a Curie temperatures of 50°-115° C. in amounts of 2-40 mole %; and (A) at least one of niobium oxides and tantalum oxides in amounts of 0.3-2 moles % in relation to 100 mole % of the mixture; and (B) at least one of cobalt oxides, nickel oxides, magnesium oxides, manganese oxides, copper oxides and oxides of a rare earth metal in amounts of 0.1-2 mole % in relation to 100 mole % of the mixture.

Further in accordance with the invention, a ceramic dielectric is provided by sintering a composition as described above. The thus obtained ceramic dielectric is remarkably reduced in variation of relative permittivity at temperatures of about 100° C., so that it has a very small temperature dependence of relative permittivity over a wide temperature range. Namely the dielectric has a small temperature dependence of relative permittivity within ±15% taking a relative permittivity at 20° C. as a standard over a temperature range between −55° C. and +125° C.

The invention will now be in detail described with reference to the drawings, in which FIG. 1 shows temperature dependence of relative permittivity of ceramic dielectrics produced by using a composition which contains barium titanate zirconate solid solution in varied amounts;

FIGS. 13 to 15 show temperature dependence of relative permittivity of still further ceramic dielectrics produced by using composition of the invention.

Figure 1:
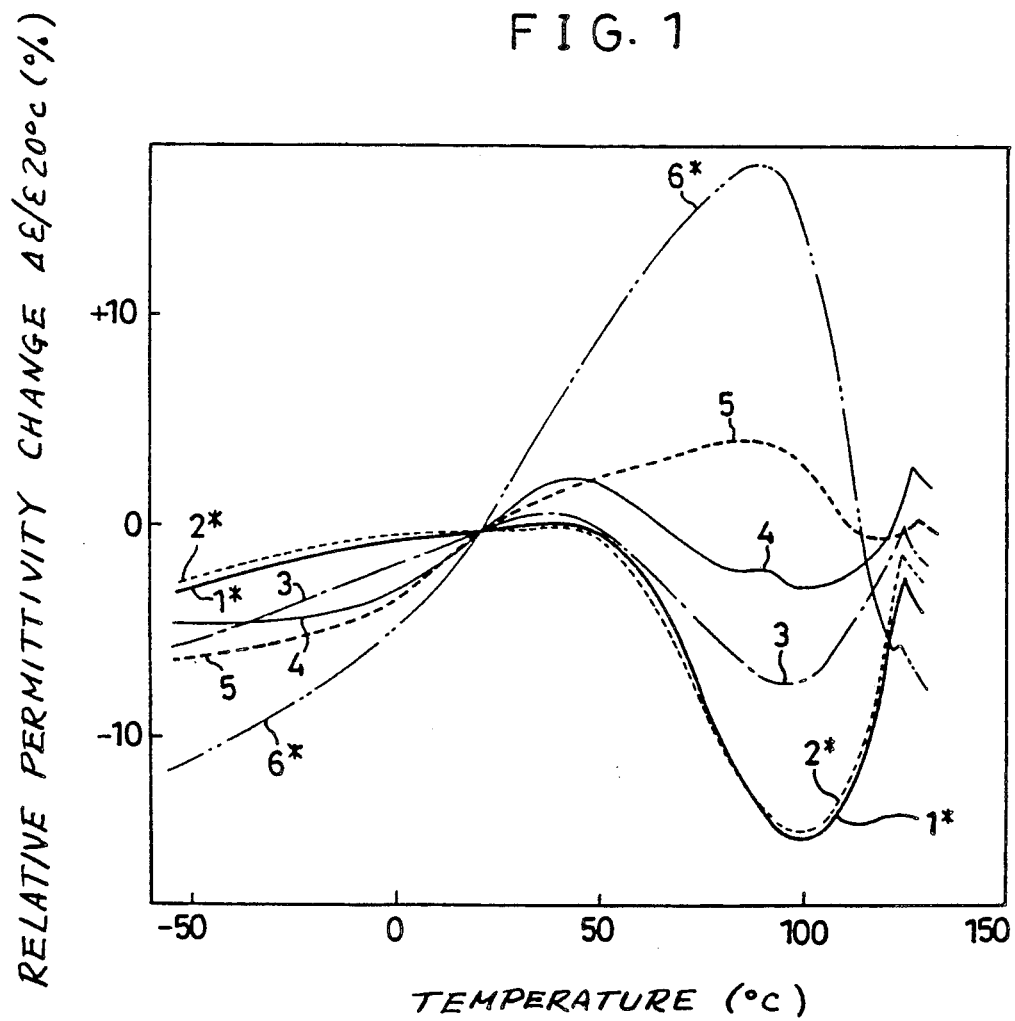

The perovskite type barium titanate solid solution used in the invention is a solid solution which has a Curie temperature between 50° C. and 115° C., and in which barium or titanium is in part displaced by at least one of strontium, zirconium and tin in the perovskite structure of barium titanate. Therefore, there may be used as such a perovskite type barium titanate solid solution, for example, barium titanate zirconate solid solution, strontium barium titanate solid solution, barium titanate stannate solid solution, barium strontium titanate zirconate solid solution or barium titanate zirconium stannate solid solution. These solid solutions may be used singly or as a mixture of two or more.

The barium titanate and the perovskite type barium titanate solid solutions may contain other perovskite type compounds therein in such amounts as not adversely affect the temperature dependence of relative permittivity and the other desired electrical properties of the resultant ceramic dielectrics.

The barium titanate and the perovskite type barium titanate solid solutions used have a particles size of 0.1-1.5 μm so that they suppress diffusion of niobium oxides or tantalum oxides thereinto to form a nonhomogeneous diffusion structure. When the barium titanate or the perovskite type barium titanate solid solution used has a particle size of less than 0.1 μm, the oxides excessively diffuse thereinto to form a homogeneous structure which shows no flat temperature dependence of relative permittivity over a wide range of temperature.

On the other hand, when the barium titanate or the perovskite type barium titanate solid solution used has a particle size of more than 1.5 μm, the diffusion of the oxides thereinto may be suppressed, so that substantial portions of primary particles of the barium titanate or solid solution have no oxides diffused thereinto. As results, the obtained dielectric shows predominantly the properties of the perovskite type barium titanate solid solutions into which substantially no metals have diffused. Namely, the resultant dielectric has no flat temperature dependence of relative permittivity.

In particular, it is preferred that the barium titanate has average particle size of 0.2-1.0 μm. The average particle size herein the specification is defined as a value (Ds) which is determined based on a BET specific surface area (Sw) by the following expression:

$$Ds = 6/\rho Sw$$

wherein $\rho$ is a density of the particle.

The composition of the invention contains barium titanate in amounts of 98-60 mole % and a perovskite type barium titanate solid solution as before described in amounts of 2-40 mole %, together with metal oxides which will be described hereinafter.

As specified as above in amounts of barium titanate and a perovskite type barium titanate solid solution, the composition provides a ceramic dielectric of a flat temperature dependence of relative permittivity as well as desired dielectric properties such as dielectric loss tangent, sintering density and resistance. However, when a ratio of barium titanate and a perovskite type barium titanate solid solution is outside the above specified, the composition provides a ceramic dielectric which has still a large temperature dependence of relative permittivity. Further, the resultant dielectric is inferior in the electrical properties such as dielectric loss tangent or insulation resistance.

In the invention, there may be used as a perovskite type barium titanate solid solution, for example, (a) a barium titanate zirconate solid solution represented by the general formula (I):

$$BaTi_{1-x}Zr_xO_3$$

wherein x is a numeral defined as $0.02 \leq x \leq 0.15$, or (b) a barium strontium titanate solid solution represented by the general formula (II):

$$Ba_{1-y}Sr_yTiO_3$$

wherein y is a numeral defined as $0.03 \leq y \leq 0.20$, or (c) a barium titanate stannate solid solution represented by the general formula (III):

$$BaTi_{1-z}Sn_zO_3$$

wherein z is a numeral defined as $0.01 \leq z \leq 0.10$, (d) a complex solid solution of two or more of the above solid solutions, or (e) a mixture of two or more of the above solid solutions.

The barium titanate zirconate solid solution used in the invention is represented by the general formula (I) in which x is a numeral between 0.02 and 0.15 inclusive. When the numeral x is outside the above specified, the resultant ceramic dielectric has still a large temperature dependence of relative permittivity. Further, the dielectric has no desired electrical properties.

Similarly, the barium strontium titanate solid solution and barium titanate stannate solid solution used in the invention are represented by the general formulas (II) and (III), respectively, in which y is a numeral between 0.03 and 0.20 inclusive, and z is a numeral between 0.01 and 0.10 inclusive. When the numeral y or z is outside the above specified, the resultant ceramic dielectric has still a large temperature dependence of relative permittivity, and further, it has no desired electrical properties.

The complex solid solution is herein the specification defined as a solid solution prepared by using at least two of the barium titanate zirconate solid solution, barium strontium titanate solid solution and barium titanate stannate solid solution as above described. Thus, the complex solid solution used may be exemplified by barium strontium titanate zirconate solid solution or barium titanate zirconate stannate solid solution.

The perovskite type barium titanate solid solution and the complex solid solution may be used singly or as a mixture of two or more.

The composition of the invention further contains at least one of niobium oxides and tantalum oxides in amounts of 0.3-2 mole %, preferably in amounts of 0.3-1.5 mole %, and at least one of cobalt oxides, nickel oxides, magnesium oxides, manganese oxides, copper oxides and oxides of a rare earth metal in amounts of 0.1-2 moles %, preferably in amounts of 0.3-1.5 mole %, in relation to 100 mole % of the mixture of the barium titanate and the perovskite type barium titanate solid solution, respectively.

Niobium oxides and tantalum oxides are diffused into barium titanate or perovskite type barium titanate solid solutions in a controlled manner in the presence of at least one of cobalt oxides, nickel oxides, magnesium oxides, manganese oxides, copper oxides and oxides of a rare earth metal, to provide a nonuniform diffusion structure in barium titanate and perovskite type barium titanate solid solutions. Namely, the latter metal oxides suppress the diffusion of the former metal oxides into barium titanate or perovskite type barium titanate solid solutions.

There may be used as an oxide of a rare earth metal, for example, oxides of yttrium, lanthanum or cerium. In place of oxides, there may be used precursors which form oxides when being heated. Thus, hydroxides, carbonates, hydrogen carbonates or nitrates may be used.

According to the invention, the composition contains the metal oxides in specific amounts as above in relation to the mixture of barium titanate and the perovskite type barium titanate solid solution, and thus it provides a ceramic dielectric which has an even relative permittivity over the temperature range as before described, as well as desired properties such as dielectric loss tangent, sintering density and resistance. However, when the amount of the metal oxides in relation to the mixture of barium titanate and the solid solution is outside the above specified, the composition fails to provide a ceramic dielectric which has a flat temperature dependence of relative permittivity over a wide range of temperature.

The composition of the invention may further contain additives such as additional perovskite compounds other than barium titanate, e.g., calcium titanate. Further, the composition of the invention may further contain bithmus oxides, silica or glass materials to, for example, reduce sintering temperature, or manganese oxides to improve the electrical properties such as resistance.

The ceramic dielectric of the invention is produced by fully admixing the composition to a uniform mixture with a conventional means such as a ball mill, molding the mixture into a green mold with the aid of an organic binder such as a water soluble polymer, e.g., polyvinyl alcohol, heating the green mold to decompose and evaporate the binder, and then sintering the mold at temperatures of about 1000°–1400° C. for a sufficient time, for example, several hours. A multilayer capacitor may be produced by forming a slip of the composition, forming a green sheet using the slip with, for example, a doctor blade, printing electrodes thereon, and then laminating and sintering the sheets.

As fully set forth, the composition of the invention contains a mixture of barium titanate and a perovskite type barium titanate solid solution together with specific metal oxides, and is sintered to diffuse the metal oxides non-uniformly thereinto, thereby to provide a ceramic dielectric which has a high relative permittivity and a very small temperature dependence of relative permittivity within ±15% taking a relative permittivity at 20° C. as a standard over a temperature range of −55° C. to +125° C. Therefore, the ceramic dielectric of the invention may be suitably used as a ceramic capacitor.

The invention will now be fully described with reference to examples, however, the invention is not limited thereto.

EXAMPLE A

Examples Using Barium Titanate Zirconate

Example 1

High purity barium titanate ($BaTiO_3$) of 0.5 μm in average particle size, high purity barium titanate zirconate solid solution ($BaTi_{0.9}Zr_{0.1}O_3$) of 0.6 μm in average particle size, cobaltous oxide (CoO) and niobium oxide ($Nb_2O_5$) in amounts shown in Table 1, respectively, were wet mixed together with a zirconium balls in a nylon-walled ball mill for three hours, to provide a composition. The composition was then taken out of the ball mill and dried.

An amount of 10 parts by weight of an 8% by weight aqueous solution of polyvinyl alcohol was added as a binder to 100 parts by weight of the composition, and the resultant composition was granulated and screened with a 35 mesh screen.

The granulated composition was then molded into green pellets of 20 mm in diameter and about 2 mm in thickness under a pressure of 1000 kg/cm² by means of dies and a hydraulic press. The green pellets were heated at 400° C. for three hours to burn out the polyvinyl alcohol, and then sintered at 1300° C. for three hours, to provide a ceramic dielectric.

The ceramic dielectric was polished at both the surfaces to a thickness of about 1.0 mm, and was coated with silver as electrodes with an ion coater. The relative permittivity, dielectric loss tangent, insulation resistance and temperature dependence of relative permittivity of the dielectric were measured.

The relative permittivity and dielectric loss tangent were measured with an LF impedance analyzer (Yokogawa-Hewllet Packard), and the insulation resistance with a PA meter (Yokogawa-Hewllet Packard). The temperature dependence of relative permittivity was measured at a frequency of 1 KHz over a temperature range of from −60° C. to +130° C. in a thermostat, taking a relative permittivity at 20° C. as a standard. The results are shown in the Table 1 and in the FIG. 1. The average particle size (or specific surface area) of barium titanate and the solid solution was measured with an automatic specific surface area measuring apparatus (Micromeritics).

The results illustrate that the composition of the invention is readily sinterable and provides a ceramic dielectric which has excellent electrical properties, in particular, a very small temperature dependence of relative permittivity. On the contrary, when barium titanate zirconate was used in amounts other than the specified hereinbefore, the resultant dielectric has a large temperature dependence of relative permittivity, and as results, it has no flat relative permittivity over a temperature range of −55° C. to +125° C.

Example 2

An amount of 85 mole % of high purity barium titanate ($BaTiO_3$) of 0.8 μm in average particle size and 15 mole % of high purity barium titanate zirconate solid solution containing zirconium in varied amounts and of 0.7 μm in average particle size were mixed together with cobaltous oxide (CoO) and tantalum oxide ($Ta_2O_5$) in amounts shown in the Table 2, respectively, to provide compositions.

TABLE 1

| | | (Example 1) | | | | Properties of Ceramic Dielectrics | | |
| | | Compositions (mole %) | | | | Sintering Density | Relative | Dielectric Loss Tangent[2] | Resistivity |
| | No. | $BaTiO_3$ | $BaTi_{0.9}Zr_{0.1}O_3$ | $Nb_2O_5$ | CoO | (g/cm³) | Permittivity[1] | (%) | (Ω · cm) |
|---|---|---|---|---|---|---|---|---|---|
| Reference | 1 | 100 | 0 | 1.0 | 0.6 | 5.72 | 4100 | 1.2 | 8.2 × 10¹¹ |
| | 2 | 99 | 1 | 1.0 | 0.6 | 5.80 | 3950 | 1.1 | 4.1 × 10¹² |
| Invention | 3 | 95 | 5 | 1.0 | 0.6 | 5.69 | 3700 | 0.9 | 3.3 × 10¹² |
| | 4 | 85 | 15 | 1.0 | 0.6 | 5.71 | 3820 | 0.8 | 9.7 × 10¹¹ |
| | 5 | 70 | 30 | 1.0 | 0.6 | 5.81 | 3920 | 1.0 | 5.2 × 10¹² |
| Reference | 6 | 50 | 50 | 1.0 | 0.6 | 5.68 | 4300 | 0.9 | 6.4 × 10¹² |

Notes:
[1] 20° C., 1 KHz
[2] 20° C., 1 KHz

Figure 2:
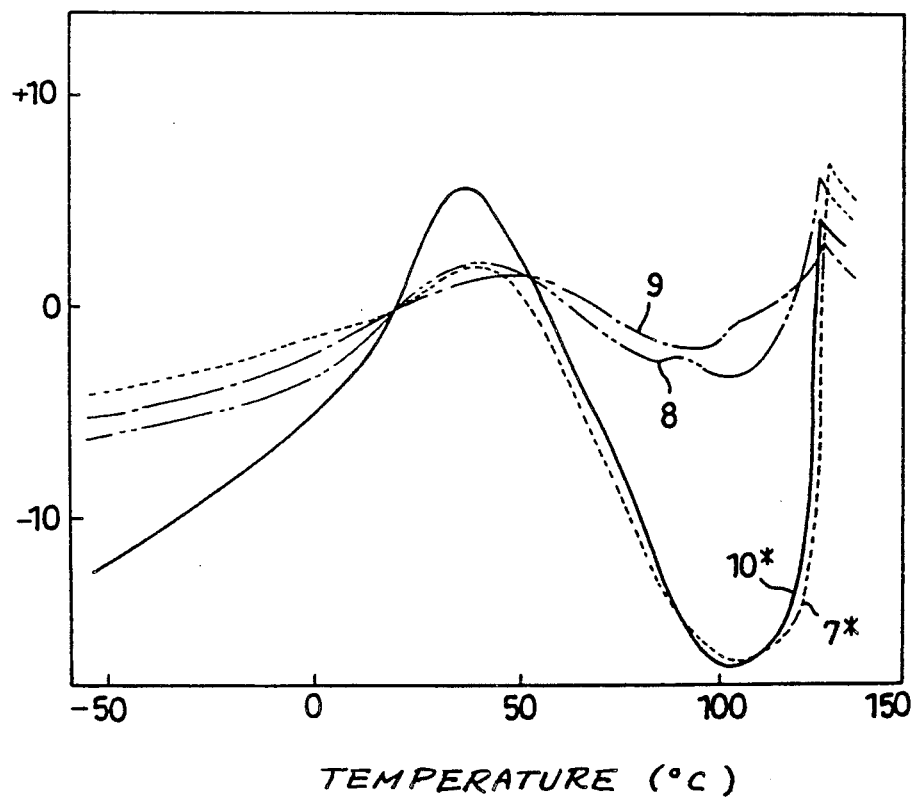
FIG. 2 shows temperature dependence of relative permittivity of ceramic dielectrics produced by using a composition of barium titanate zirconate solid solution which contains zirconium in varied amounts.

Ceramic dielectrics were produced in the same manner as in Example 1 using the compositions. The relative permittivity, dielectric loss tangent, insulation resistance and temperature dependence of relative permittivity of the dielectrics are shown in the Table 2 and the FIG. 2.

The results illustrate that the composition of the invention is readily sintered to provide a ceramic dielectric of a very small temperature dependence of relative permittivity. However, when the amount of zirconium in barium titanate zieconate is other than the specified hereinbefore, the resultant dielectric has a large temperature dependence of relative permittivity, and as results, it has no flat relative permittivity over a temperature range of $-55°$ C. to $+125°$ C.

Example 3

An amount of 80 mole % of high purity barium titanate ($BaTiO_3$) of 0.6 $\mu$m in average particle size and 20 mole % of high purity barium titanate zirconate solid solution ($BaTi_{0.92}Zr_{0.08}O_3$) of 0.6 $\mu$m in average particle sizer were mixed together with nickel oxide (NiO), magnesium oxide (MgO) and niobium oxide ($Nb_2O_5$) in amounts shown in the Table 3, respectively, to prepare a composition.

Figure 3:
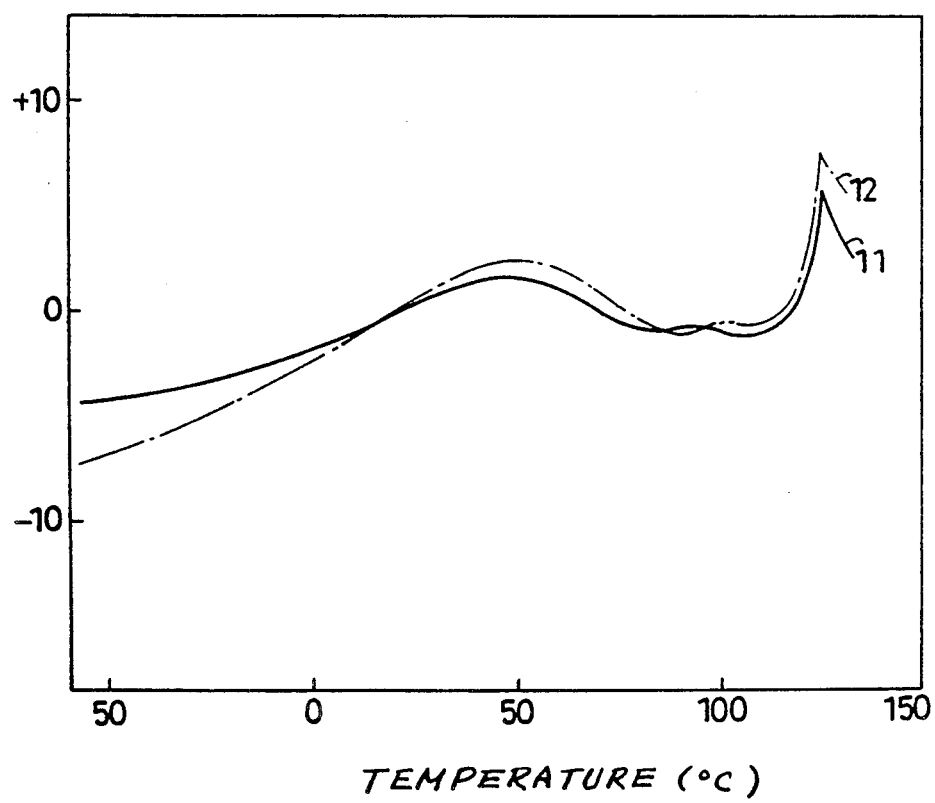
FIGS. 3 to 5 show temperature dependence of relative permittivity of ceramic dielectrics produced by using a composition of the invention.

Ceramic dielectrics were produced in the same manner as in Example 1 using the composition. The electrical properties of the dielectric are shown in the Table 3 and in the FIG. 3.

The results illustrate that the composition of the invention is readily sintered to provide a ceramic dielectric which has a very small temperature dependence of relative permittivity.

Example 4

An amount of 80 mole % of high purity barium titanate ($BaTiO_3$) of 0.3 $\mu$m in average particle size and 20 mole % of high purity barium titanate zirconate solid solution ($BaTi_{0.9}Zr_{1.0}O_3$) of 0.3 $\mu$m in average particle size were mixed together with cobaltous oxide (CoO), manganese carbonate ($MnCO_3$) and niobium oxide ($Nb_2O_5$) in amounts shown in the Table 4, respectively, to prepare a composition.

Figure 4:
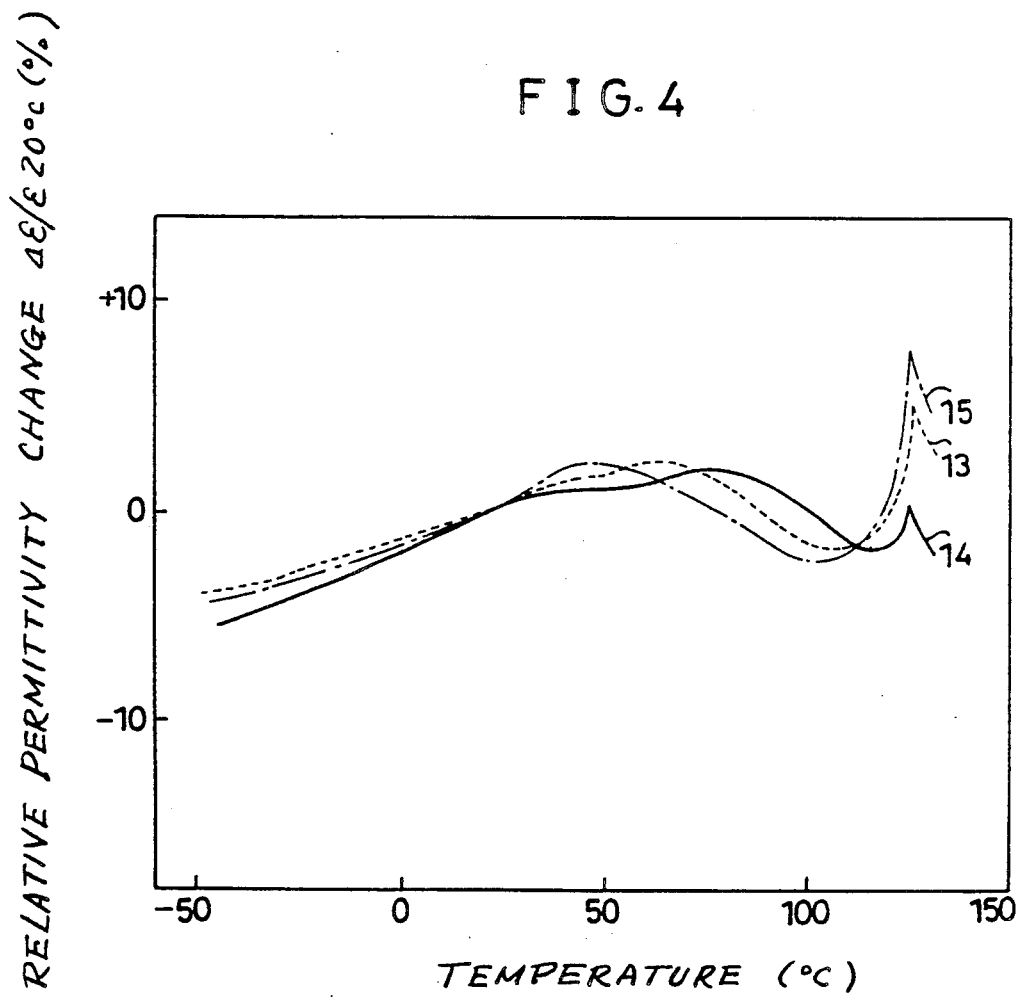

Ceramic dielectrics were produced in the same manner as in Example 1 using the composition. The electrical properties of the dielectric are shown in the Table 4 and FIG. 4.

The results illustrate that the composition of the invention is readily sintered to provide a ceramic dielectric which has a very small temperature dependence of relative permittivity.

TABLE 2
(Example 2)

| | | Compositions[1] | | | Properties of Ceramic Dielectrics | | | |
| | No. | x in $BaTi_{1-x}Zr_xO_3$ | $Ta_2O_5$ (mole %) | CoO | Sintering Density (g/cm$^3$) | Relative Permittivity[2] | Dielectric Loss Tangent[3] (%) | Resistivity ($\Omega \cdot$ cm) |
|---|---|---|---|---|---|---|---|---|
| Reference | 7 | 0.01 | 1.1 | 0.5 | 5.70 | 3660 | 0.8 | $4.2 \times 10^{12}$ |
| Invention | 8 | 0.05 | 1.1 | 0.5 | 5.68 | 3770 | 1.1 | $3.2 \times 10^{12}$ |
| | 9 | 0.10 | 1.1 | 0.5 | 5.72 | 3870 | 0.9 | $6.1 \times 10^{12}$ |
| Reference | 10 | 0.20 | 1.1 | 0.5 | 5.70 | 5100 | 0.9 | $4.9 \times 10^{12}$ |

Notes:
[1] The compositions were composed of 85 mole % of $BaTiO_3$, 15 mole % of $BaTi_{1-x}Zr_xO_3$, and $Ta_2O_5$ and CoO in amounts as shown in the Table.
[2] 20° C., 1 KHz
[3] 20° C., 1 KHz TABLE 3
(Example 3)

| | | Metal Oxides (mole %)[1] | | | Properties of Ceramic Dielectrics | | | |
| | No. | NiO | MgO | $Nb_2O_5$ | Sintering Density (g/cm$^3$) | Relative Permittivity[2] | Dielectric Loss Tangent[3] (%) | Resistivity ($\Omega \cdot$ cm) |
|---|---|---|---|---|---|---|---|---|
| Invention | 11 | 0.7 | — | 0.6 | 5.82 | 4000 | 1.2 | $1.4 \times 10^{12}$ |
| | 12 | — | 0.7 | 1.5 | 5.69 | 3870 | 0.9 | $4.4 \times 10^{12}$ |

Notes:
[1] The compositions were composed of 80 mole % of $BaTiO_3$, 20 mole % of $BaTi_{0.92}Zr_{0.08}O_3$, and NiO, MgO and $Nb_2O_5$ in amounts as shown in the Table.
[2] 20° C., 1 KHz
[3] 20° C., 1 KHz TABLE 4
(Example 4)

| | | Metal Oxides (mole %)[1] | | | Properties of Ceramic Dielectrics | | | |
| | No. | CoO | $MnCO_3$ | $Nb_2O_5$ | Sintering Density (g/cm$^3$) | Relative Permittivity[2] | Dielectric Loss Tangent[3] (%) | Resistivity ($\Omega \cdot$ cm) |
|---|---|---|---|---|---|---|---|---|
| Invention | 13 | 0.5 | 0.2 | 0.8 | 5.70 | 3660 | 1.2 | $5.4 \times 10^{12}$ |
| | 14 | 0.6 | — | 0.8 | 5.74 | 3820 | 0.9 | $2.5 \times 10^{12}$ |
| | 15 | — | 0.6 | 1.0 | 5.72 | 3710 | 0.9 | $1.8 \times 10^{12}$ |

Notes:
[1] The compositions were composed of 80 mole % of $BaTiO_3$, 20 mole % of $BaTi_{0.92}Zr_{0.08}O_3$, and CoO, $MnCO_3$ and $Nb_2O_5$ in amounts as shown in the Table.
[2] 20° C., 1 KHz
[3] 20° C., 1 KHz

Example 5

An amount of 80 mole % of high purity barium titanate ($BaTiO_3$) of 0.8 μm in average particle size and 20 mole % of high purity barium titanate zirconate solid solution ($BaTi_{0.92}Zr_{0.08}O_3$) of 0.8 μm in average particle size were mixed together with cobaltous oxide (CoO) and niobium oxide ($Nb_2O_5$) in amounts shown in the Table 5, respectively, to prepare a composition.

Figure 5:
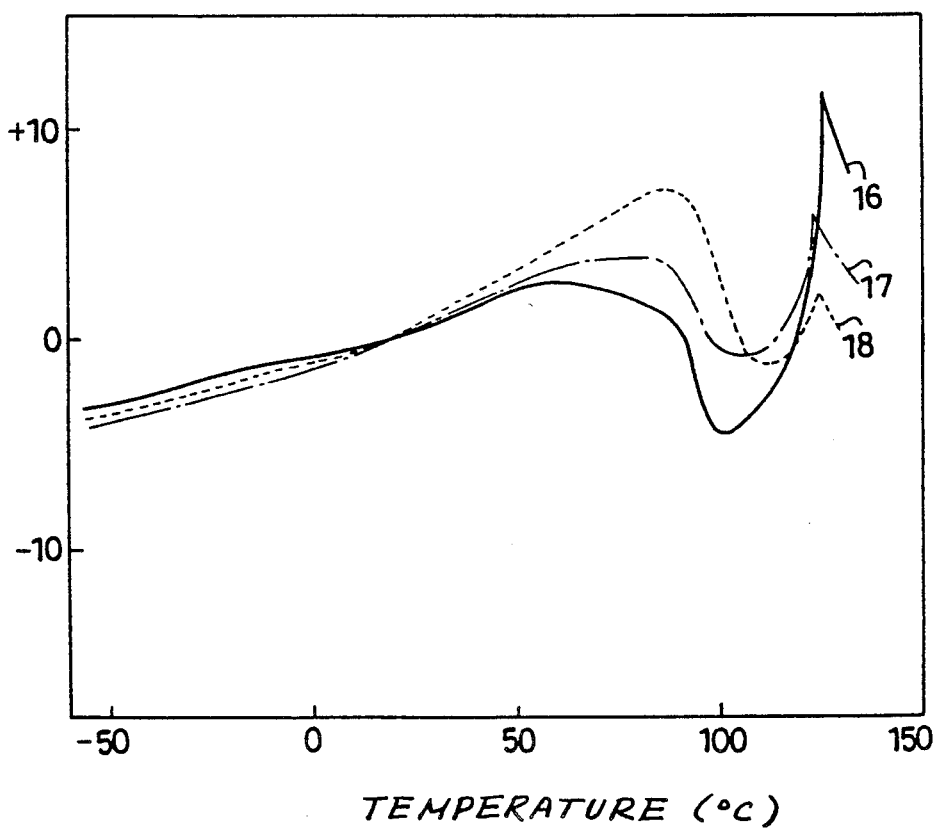

The composition was molded into green pellets in the same manner as in Example 1, and then the green pellets were heated at 400° C. for three hours to burn out the polyvinyl alcohol as a binder, and sintered at 1250° C., 1300° C. and 1350° C., respectively, for three hours, to provide ceramic dielectrics. The relative permittivity, dielectric loss tangent, insulation resistance and temperature dependence of relative permittivity of the dielectrics are shown in the Table 5 and FIG. 5.

The results illustrate that the composition of the invention is readily sintered to provide a ceramic dielectric which has a very small temperature dependence of relative permittivity.

TABLE 5
(Example 5)

| | No. | Sintering Temperature (°C.) | Metal Oxides (mole %)[1] | | Properties of Ceramic Dielectrics | | | |
|---|---|---|---|---|---|---|---|---|
| | | | CoO | $Nb_2O_5$ | Sintering Density (g/cm³) | Relative Permittivity[2] | Dielectric Loss Tangent[3] (%) | Resistivity (Ω · cm) |
| Invention | 16 | 1250 | 0.6 | 0.9 | 5.63 | 3730 | 1.1 | $3.8 \times 10^{12}$ |
| | 17 | 1300 | 0.6 | 0.9 | 5.74 | 3710 | 1.1 | $5.2 \times 10^{12}$ |
| | 18 | 1350 | 0.6 | 0.9 | 5.75 | 3780 | 1.1 | $3.0 \times 10^{12}$ |

Notes:
[1]The compositions were composed of 80 mole % of $BaTiO_3$, 20 mole % of $BaTi_{0.92}Zr_{0.08}O_3$, and CoO and $Nb_2O_5$ in amounts as shown in the Table.
[2]20° C., 1 KHz
[3]20° C., 1 KHz

EXAMPLE B

Examples Using Barium Strontium Titanate or Barium Strontium Titanate Zirconate

Example 6

High purity barium titanate ($BaTiO_3$) of 0.5 μm in average particle size, high purity barium strontium titanate solid solution ($Ba_{0.9}Sr_{0.1}TiO_3$) of 0.7 μm in average particle size, cobaltous oxide (CoO) and niobium oxide ($Nb_2O_5$), in amounts shown in the Table 6, respectively, were wet mixed in the same manner as in Example 1, and dried, to prepare a composition.

Figure 6:
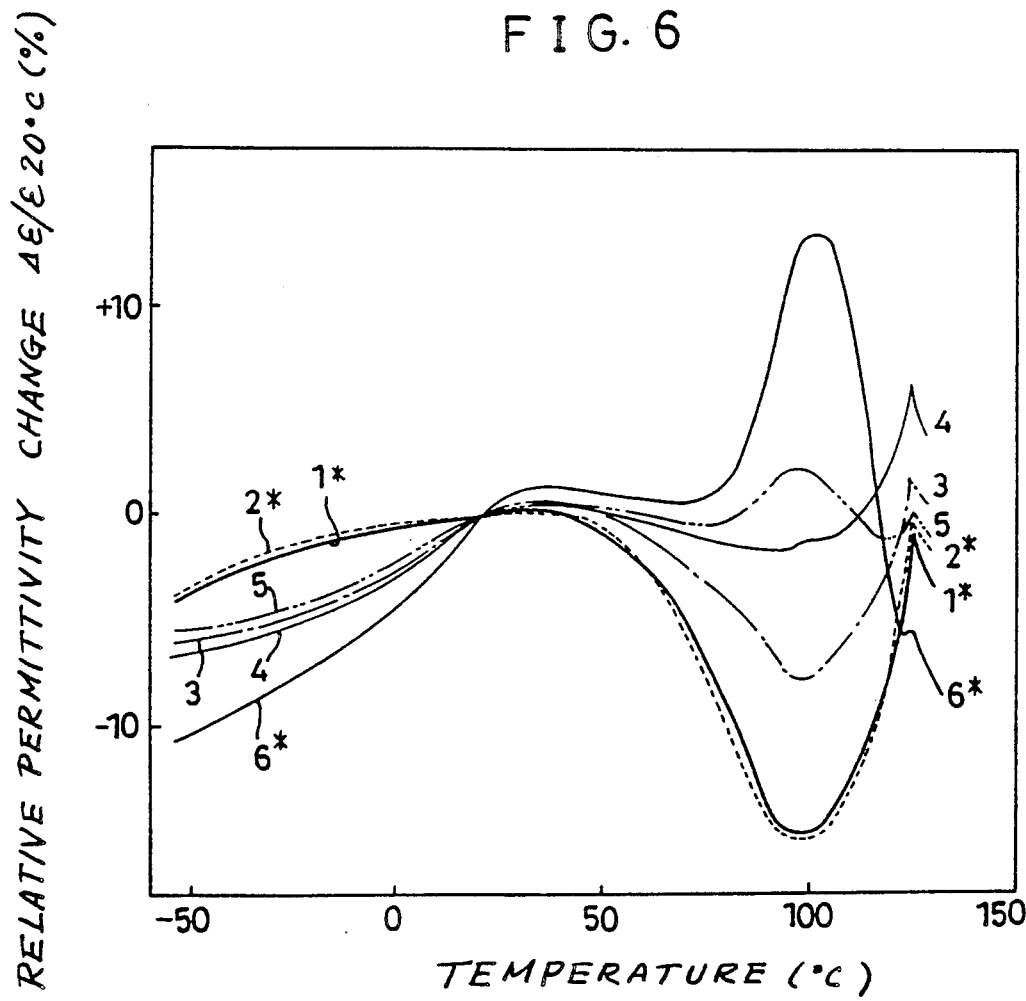
FIG. 6 shows temperature dependence of relative permittivity of ceramic dielectrics produced by using a composition which contains barium strontium titanate solid solution in varied amounts.

Ceramic dielectric were prepared by using the composition and electrical properties thereof were measured in the same manner as in Example 1. The results are shown in the Table 6 and in the FIG. 6.

As apparent, the composition of the invention is readily sintered to provide a ceramic dielectric of a very small temperature dependence of relative permittivity. On the contrary, when barium strontium titanate was used in amounts other than the specified as hereinbefore, the resultant dielectric has a large temperature dependence of relative permittivity at about 100° C., and as results, it has no flat relative permittivity over a temperature range of from −55° C. to +125° C. Moreover, the dielectric has a low relative permittivity.

TABLE 6
(Example 6)

| | No. | Compositions (mole %) | | | | Properties of Ceramic Dielectrics | | | |
|---|---|---|---|---|---|---|---|---|---|
| | | $BaTiO_3$ | $Ba_{0.9}Sr_{0.1}TiO_3$ | $Nb_2O_5$ | CoO | Sintering Density (g/cm³) | Relative Permittivity[1] | Dielectric Loss Tangent[2] (%) | Resistivity (Ω · cm) |
| Reference | 1 | 100 | 0 | 1.0 | 0.6 | 5.72 | 4100 | 1.2 | $8.2 \times 10^{11}$ |
| | 2 | 99 | 1 | 1.0 | 0.6 | 5.67 | 3870 | 1.4 | $1.2 \times 10^{12}$ |
| Invention | 3 | 90 | 10 | 1.0 | 0.6 | 5.70 | 3810 | 1.1 | $2.5 \times 10^{12}$ |
| | 4 | 80 | 20 | 1.0 | 0.6 | 5.65 | 3910 | 1.2 | $2.0 \times 10^{12}$ |
| | 5 | 70 | 30 | 1.0 | 0.6 | 5.71 | 3650 | 1.2 | $9.0 \times 10^{12}$ |
| Reference | 6 | 50 | 50 | 1.0 | 0.6 | 5.57 | 2730 | 1.3 | $1.1 \times 10^{12}$ |

Notes:
[1]20° C., 1 KHz
[2]20° C., 1 KHz

Example 7

An amount of 85 mole % of high purity barium titanate ($BaTiO_3$) of 0.8 μm in average particle size and 15 mole % of high purity barium strontium titanate solid solution containing strontium in varied amounts and of 0.6 μm in average particle size were mixed together with cobaltous oxide (CoO) and tantalum oxide ($Ta_2O_5$) in amounts shown in the Table 7, respectively, to provide compositions.

Figure 7:
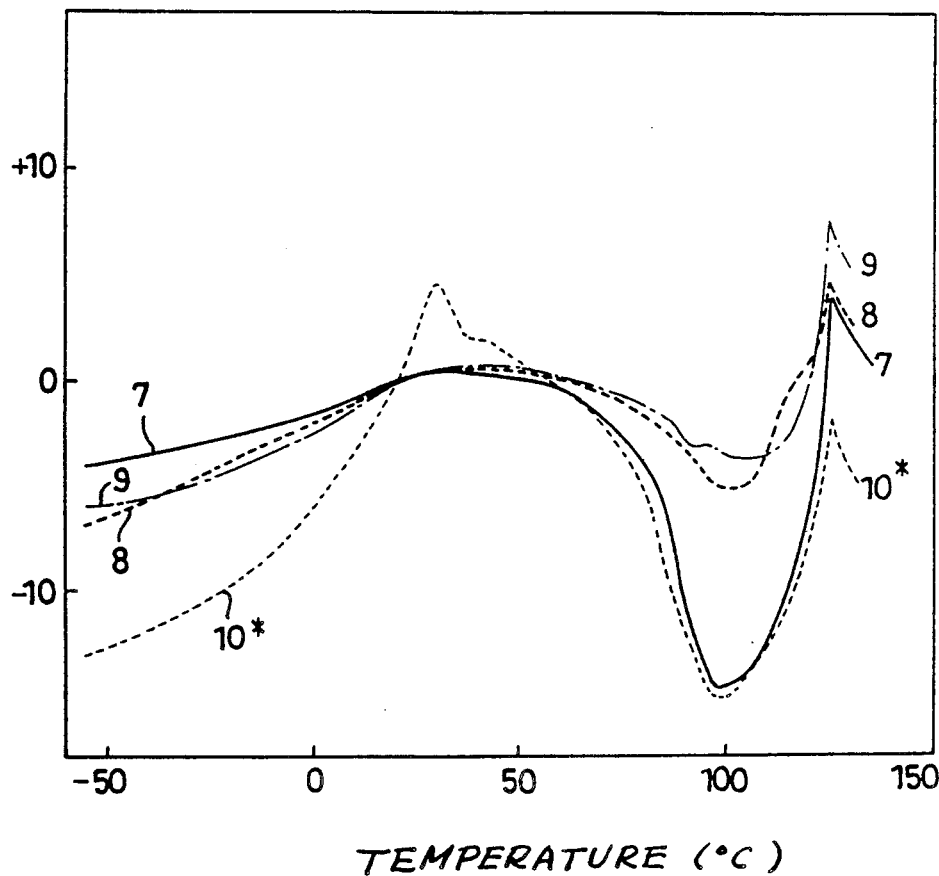
FIG. 7 shows temperature dependence of relative permittivity of ceramic dielectrics produced by using a composition of barium strontium titanate solid solution which contains strontium in varied amounts.

Ceramic dielectrics were produced in the same manner as in Example 1 using the compositions. The electrical properties thereof are shown in the Table 7 and FIG. 7.

As illustrated, the composition of the invention is readily sintered to provide a ceramic dielectric which has excellent electrical properties, in particular, a very small temperature dependence of relative permittivity. On the contrary, when the amount of strontium in barium strontium titanate is other than the specified hereinbefore, the resultant dielectric has a large variation of relative permittivity at temperatures of around 100° C., and as results, it has no flat relative permittivity over a temperature range of −55° C. to +125° C.

Example 8

Figure 9:
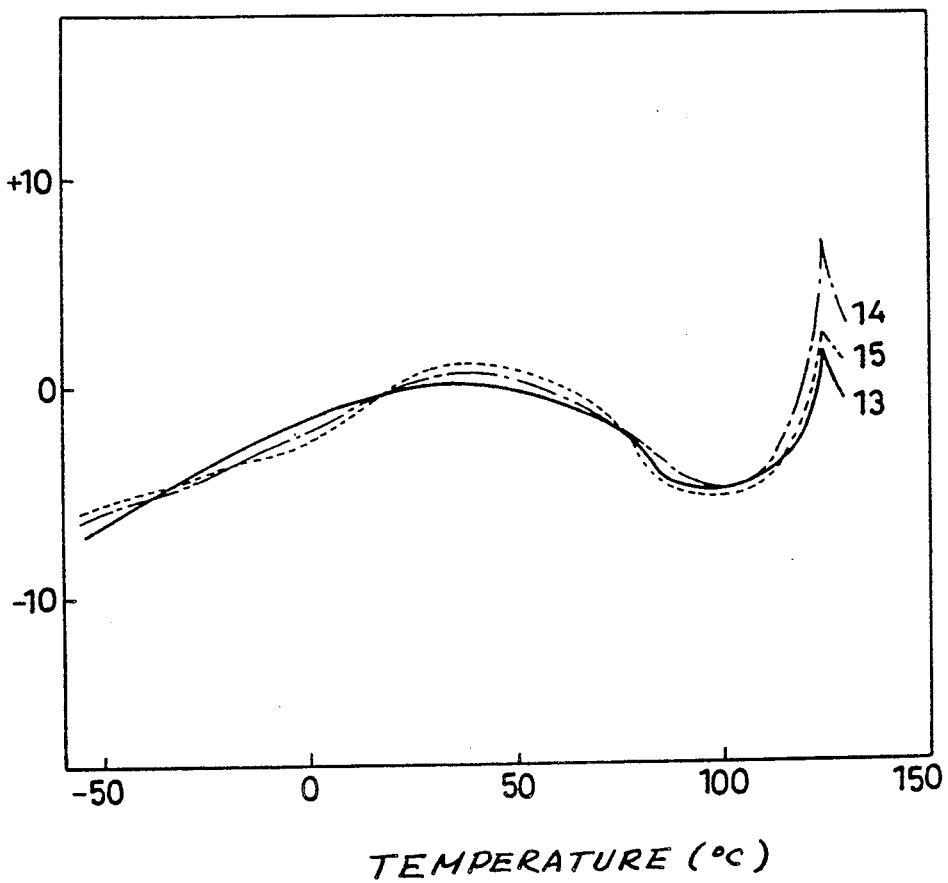

An amount of 85 mole % of high purity barium titanate ($BaTiO_3$) of 0.6 μm in average particle size and 15 mole % of high purity barium strontium titanate solid solution ($Ba_{0.9}Sr_{0.1}TiO_3$) of 0.6 μm in average particle cal properties of the dielectrics are shown in the Table 9 and FIG. 9.

TABLE 7

(Example 7)

| | | Compositions[1] | | | Properties of Ceramic Dielectrics | | | |
| | | | | | Sintering | | Dielectric Loss | |
| | No. | x in $Ba_{1-x}Sr_xTiO_3$ | $Ta_2O_5$ (mole %) | CoO (mole %) | Density ($g/cm^3$) | Relative Permittivity[2] | Tangent[3] (%) | Resistivity ($\Omega \cdot cm$) |
| --- | --- | --- | --- | --- | --- | --- | --- | --- |
| Reference | 7 | 0.01 | 1.1 | 0.5 | 5.69 | 3870 | 0.9 | $2.9 \times 10^{12}$ |
| Invention | 8 | 0.07 | 1.1 | 0.5 | 5.71 | 3920 | 0.9 | $1.8 \times 10^{12}$ |
| | 9 | 0.12 | 1.1 | 0.5 | 5.75 | 3780 | 1.2 | $3.3 \times 10^{12}$ |
| Reference | 10 | 0.30 | 1.1 | 0.5 | 5.70 | 4100 | 0.9 | $1.7 \times 10^{12}$ |

Notes:
[1]The compositions were composed of 85 mole % of $BaTiO_3$, 15 mole % of $Ba_{1-x}Sr_xTiO_3$, and $Ta_2O_5$ and CoO in amounts as shown in the Table.
[2]20° C., 1 KHz
[3]20° C., 1 KHz

TABLE 8

(Example 8)

| | | Metal Oxides (mole %)[1] | | | Properties of Ceramic Dielectrics | | | |
| | | | | | Sintering Density | Relative | Dielectric Loss Tangent[3] | Resistivity |
| | No. | NiO | MgO | $Nb_2O_5$ | ($g/cm^3$) | Permittivity[2] | (%) | ($\Omega \cdot cm$) |
| --- | --- | --- | --- | --- | --- | --- | --- | --- |
| Invention | 11 | 0.7 | — | 0.6 | 5.78 | 3880 | 0.9 | $2.2 \times 10^{12}$ |
| | 12 | — | 0.7 | 1.5 | 5.76 | 3710 | 1.1 | $1.5 \times 10^{12}$ |

Notes:
[1]The compositions were composed of 85 mole % of $BaTiO_3$, 15 mole % of $Ba_{0.9}Sr_{0.1}TiO_3$, and NiO, MgO and $Nb_2O_5$ in amounts as shown in the Table.
[2]20° C., 1 KHz
[3]20° C., 1 KHz

TABLE 9

(Example 9)

| | | Metal Oxides (mole %)[1] | | | Sintering Density | Relative | Dielectric Loss Tangent[3] | Resistivity |
| | No. | CoO | $MnCO_3$ | $Nb_2O_5$ | ($g/cm^3$) | Permittivity[2] | (%) | ($\Omega \cdot cm$) |
| --- | --- | --- | --- | --- | --- | --- | --- | --- |
| Invention | 13 | 0.5 | 0.2 | 0.8 | 5.72 | 3750 | 0.8 | $1.4 \times 10^{12}$ |
| | 14 | 0.6 | — | 0.8 | 5.71 | 3950 | 1.0 | $3.8 \times 10^{12}$ |
| | 15 | — | 0.6 | 1.0 | 5.69 | 3690 | 0.8 | $2.1 \times 10^{12}$ |

Notes:
[1]The compositions were composed of 85 mole % of $BaTiO_3$, 15 mole % of $Ba_{0.9}Sr_{0.1}TiO_3$, and CoO, $MnCO_3$ and $Nb_2O_5$ in amounts as shown in the Table.
[2]20° C., 1 KHz
[3]20° C., 1 KHz size were mixed together with nickel oxide (NiO), magnesium oxide (MgO) and niobium oxide ($Nb_2O_5$) in amounts shown in the Table 8, respectively, to prepare a composition.

Figure 8:
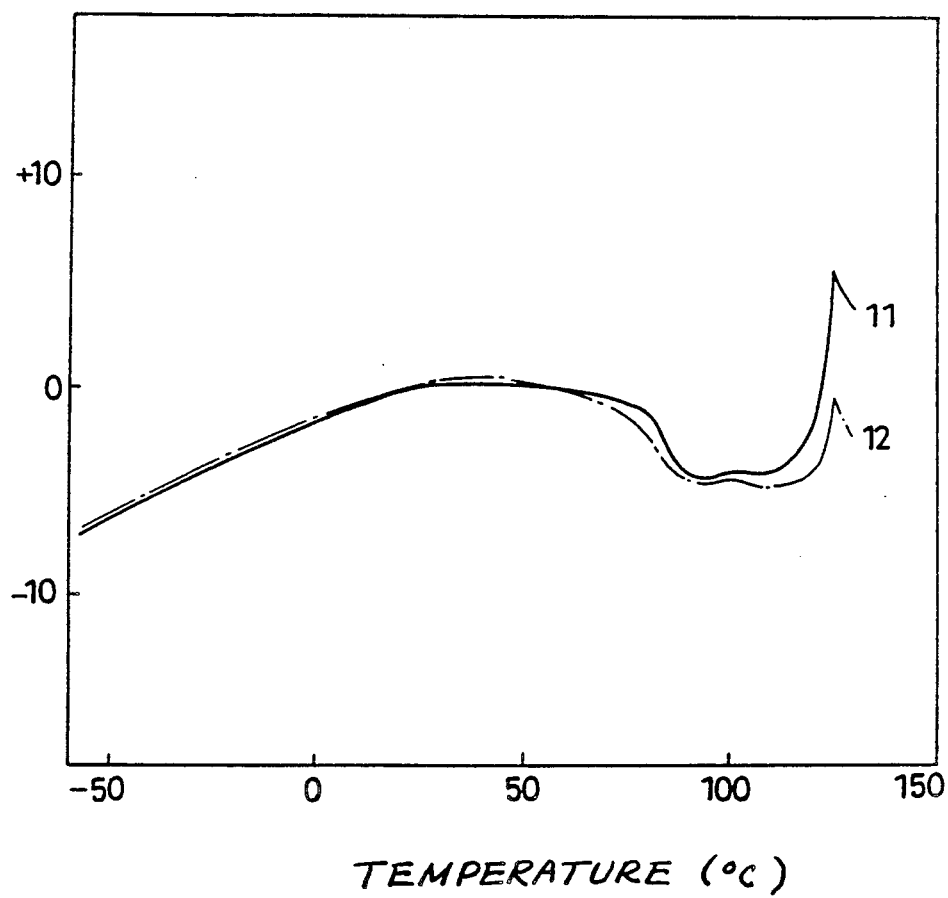
FIGS. 8 to 10 show temperature dependence of relative permittivity of further ceramic dielectrics produced by using composition of the invention.

Ceramic dielectrics were produced in the same manner as in Example 1 using the compositions. The electrical properties of the dielectric are shown in the Table 8 and FIG. 8.

The results illustrate that the composition of the invention is readily sintered to provide a ceramic dielectric which has a very small temperature dependence of relative permittivity.

Example 9

An amount of 85 mole % of high purity barium titanate ($BaTiO_3$) of 0.3 μm in average particle size and 15 mole % of high purity barium strontium titanate solid solution ($Ba_{0.9}Sr_{0.1}TiO_3$) of 0.5 μm in average particle size were mixed together with cobaltous oxide (CoO), manganese carbonate ($MnCO_3$) and niobium oxide ($Nb_2O_5$) in amounts shown in the Table 9, respectively, to provide a composition.

Ceramic dielectrics were produced in the same manner as in Example 1 using the compositions. The electrical properties of the dielectrics are shown in the Table 9 and FIG. 9.

The composition of the invention is readily sintered to provide a ceramic dielectric of a very small temperature dependence of relative permittivity.

Example 10

An amount of 80 mole % of high purity barium titanate ($BaTiO_3$) of 0.8 μm in average particle size and 20 mole % of high purity barium strontium titanate zirconate solid solution ($Ba_{0.97}Sr_{0.03}Ti_{0.95}Zr_{0.05}O_3$) of 0.8 μm in average particle size were mixed together with cobaltous oxide (CoO) and niobium oxide ($Nb_2O_5$) in amounts shown in Table 10, respectively, to prepare a composition.

Figure 10:
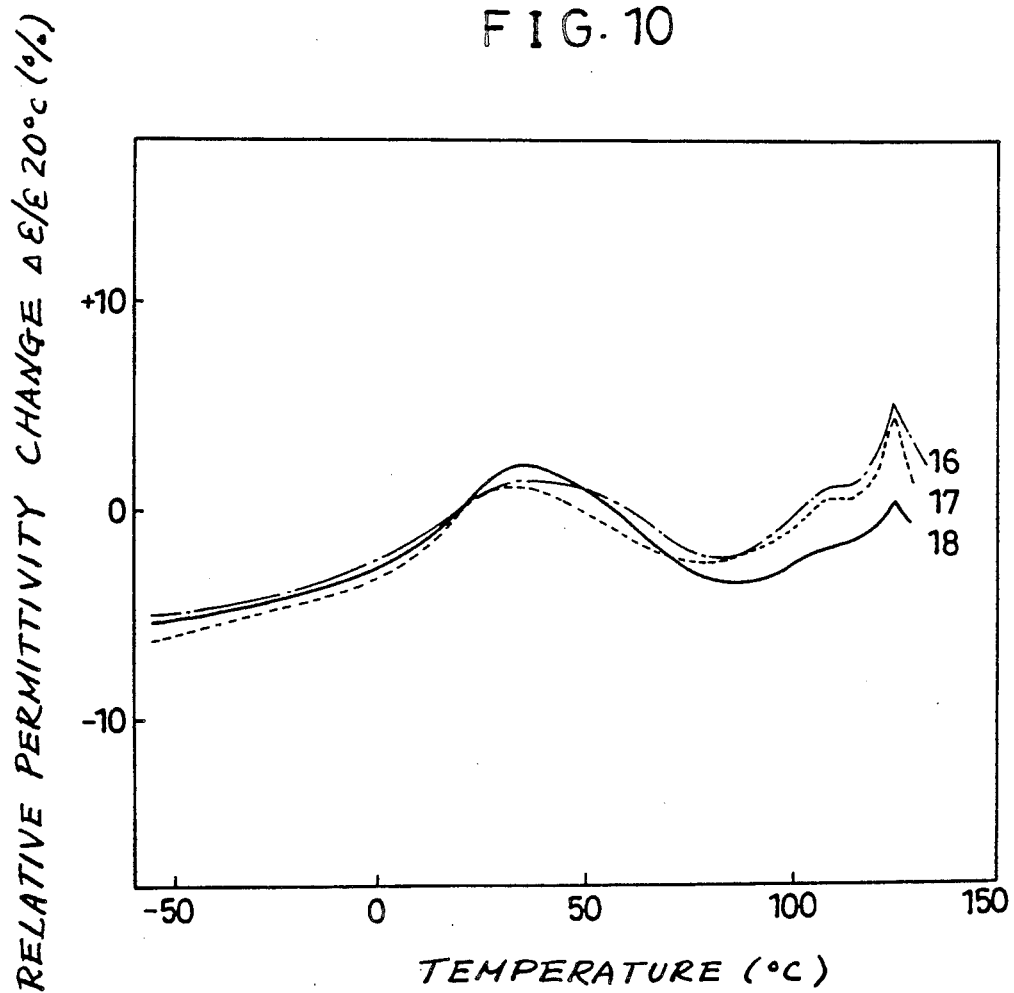

The composition was molded into green pellets in the same manner as in Example 1, and then the green pellets were heated at 400° C. for three hours to burn out the polyvinyl alcohol, and sintered at 1280° C., 1330° C. and 1380° C., respectively, for three hours, to provide ceramic dielectrics. The electrical properties of the dielectrics are shown in the Table 10 and FIG. 10.

As illustrated, the composition of the invention is readily sintered at any temperatures as above, and provides a ceramic dielectric which has a very small temperature dependence of relative permittivity.

ther, the resultant dielectric has a low relative permittivity.

TABLE 10

(Example 10)

|  | No. | Sintering Temperature (°C.) | Metal Oxides (mole %)[1] | | Sintering Density (g/cm³) | Properties of Ceramic Dielectrics | | |
|---|---|---|---|---|---|---|---|---|
|  |  |  | CoO | Nb$_2$O$_5$ |  | Relative Permittivity[2] | Dielectric Loss Tangent[3] (%) | Resistivity (Ω · cm) |
| Invention | 16 | 1280 | 0.6 | 0.9 | 5.70 | 3810 | 1.0 | 2.1 × 10$^{12}$ |
|  | 17 | 1330 | 0.6 | 0.9 | 5.75 | 3800 | 1.1 | 1.9 × 10$^{12}$ |
|  | 18 | 1380 | 0.6 | 0.9 | 5.74 | 3910 | 1.0 | 1.5 × 10$^{12}$ |

Notes:
[1] The compositions were composed of 80 mole % of BaTiO$_3$, 20 mole % of Ba$_{0.97}$Sr$_{0.03}$Ti$_{0.95}$Zr$_{0.05}$O$_3$, and CoO and Nb$_2$O$_5$ in amounts as shown in the Table.
[2] 20° C., 1 KHz
[3] 20° C., 1 KHz

TABLE 11

(Example 11)

|  | No. | Compositions (mole %) | | | | Sintering Density (g/cm³) | Properties of Ceramic Dielectrics | | |
|---|---|---|---|---|---|---|---|---|---|
|  |  | BaTiO$_3$ | BaTi$_{0.96}$Sn$_{0.04}$O$_3$ | Nb$_2$O$_5$ | CoO |  | Relative Permittivity[1] | Dielectric Loss Tangent[2] (%) | Resistivity (Ω · cm) |
| Reference | 1 | 100 | 0 | 1.0 | 0.6 | 5.72 | 4100 | 1.2 | 8.2 × 10$^{11}$ |
|  | 2 | 99 | 1 | 1.0 | 0.6 | 5.69 | 4000 | 1.2 | 2.1 × 10$^{12}$ |
| Invention | 3 | 95 | 5 | 1.0 | 0.6 | 5.68 | 3710 | 0.8 | 1.9 × 10$^{12}$ |
|  | 4 | 80 | 20 | 1.0 | 0.6 | 5.66 | 3700 | 1.1 | 3.0 × 10$^{12}$ |
|  | 5 | 70 | 30 | 1.0 | 0.6 | 5.68 | 3510 | 1.1 | 8.8 × 10$^{11}$ |
| Reference | 6 | 50 | 50 | 1.0 | 0.6 | 5.69 | 2880 | 1.0 | 3.2 × 10$^{12}$ |

Notes:
[1] 20° C., 1 KHz
[2] 20° C., 1 KHz

EXAMPLE C

Barium Using Barium Titanate Stannate or Barium Titanate Zirconate Stannate

Example 11

High purity barium titanate (BaTiO$_3$) of 0.5 μm in average particle size, high purity barium titanate stannate solid solution (BaTi$_{0.96}$Sn$_{0.04}$O$_3$) of 0.7 μm in average particle size, cobaltous oxide (CoO) and niobium oxide (Nb$_2$O$_5$), in amounts shown in the Table 11, respectively, were wet mixed in the same manner as in Example 1, and dried, to prepare a composition.

Figure 11:
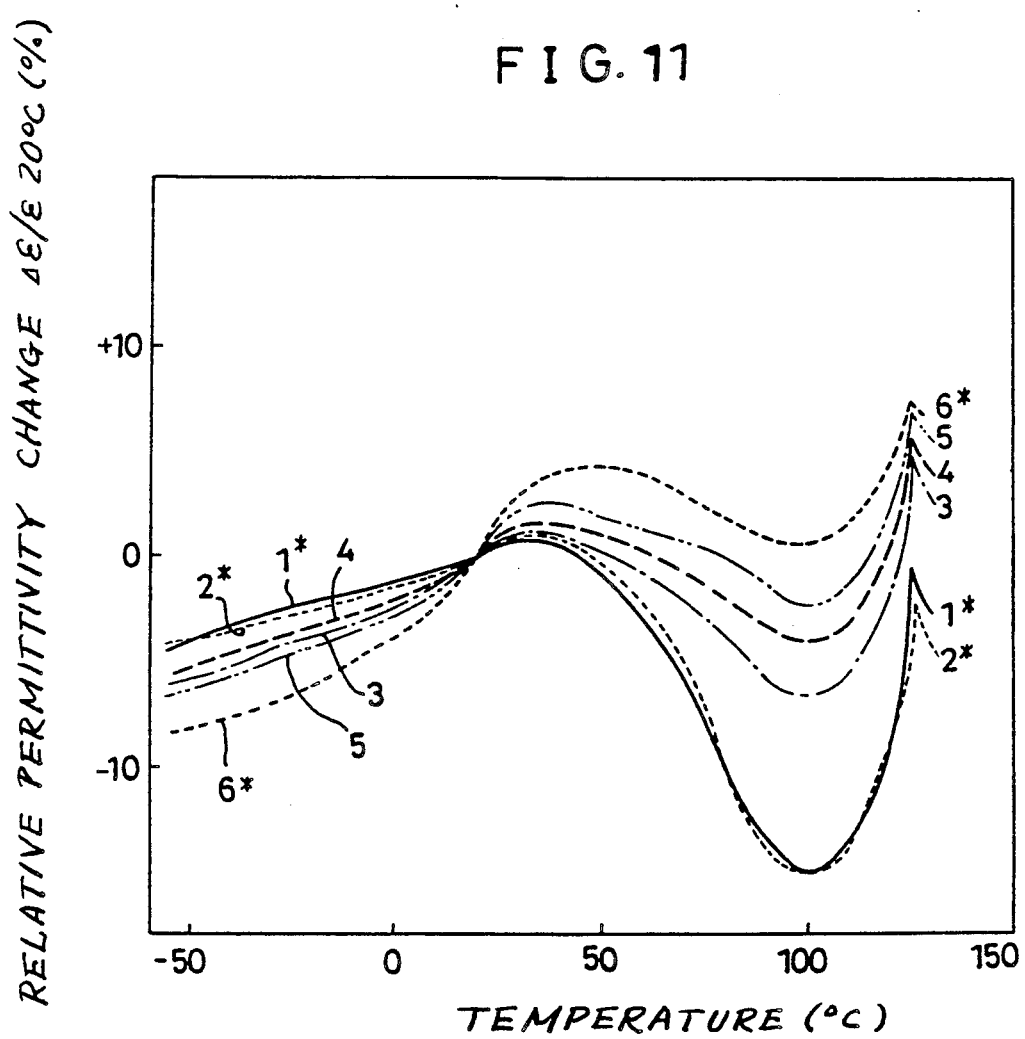
FIG. 11 shows temperature dependence of relative permittivity of ceramic dielectrics produced by using a composition which contains barium titanate stannate solid solution in varied amounts.

Ceramic dielectric were prepared by using the composition in the same manner as in Example 1, and the electrical properties of the dielectrics are shown in the Table 11 and FIG. 11.

As apparent, the composition of the invention is readily sintered to provide a ceramic dielectric of a very small temperature dependence of relative permittivity. On the contrary, when barium strontium stannate was used in amounts other than the specified as hereinbefore, the resultant dielectric has a large temperature dependence of relative permittivity at about 100° C., and as results, it has no flat relative permittivity over a temperature range of from −55° C. to +125° C. Further, the resultant dielectric has a low relative permittivity.

Example 12

An amount of 80 mole % of high purity barium titanate (BaTiO$_3$) of 0.8 μm in average particle size and 20 mole % of high purity barium titanate stannate solid solution containing tin in varied amounts and of 0.7 μm in average particle size were mixed together with cobaltous oxide (CoO) and tantalum oxide (Ta$_2$O$_5$) in amounts shown in the Table 12, respectively, to provide compositions.

Figure 12:
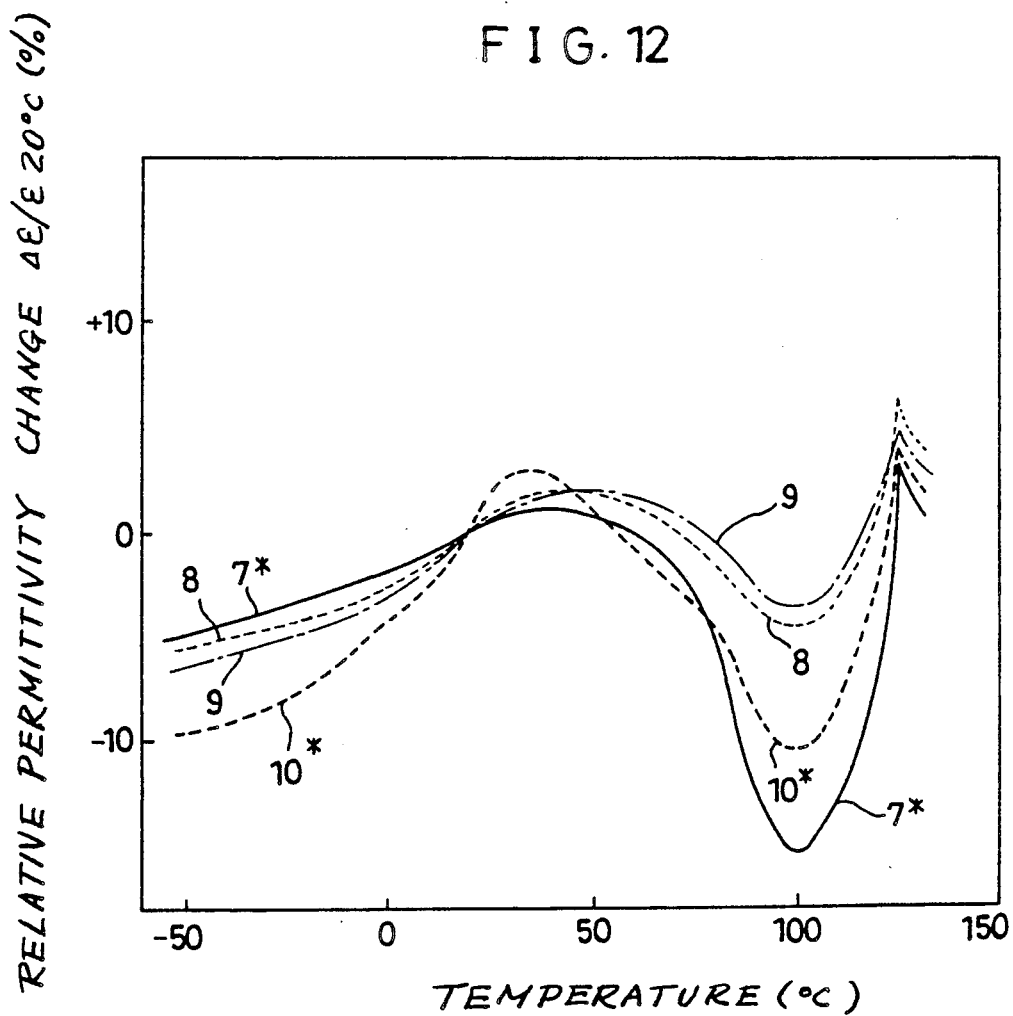
FIG. 12 shows temperature dependence of relative permittivity of ceramic dielectrics produced by using a composition of barium titanate stannate solid solution which contains tin in varied amounts.

Ceramic dielectrics were produced in the same manner as in Example 1 using the compositions. The electrical properties of the resultant dielectrics are shown in the Table 12 and FIG. 12.

As illustrated, the composition of the invention is readily sintered to provide a ceramic dielectric which has excellent electrical properties, in particular, a very small temperature dependence of relative permittivity. However, when the amount of tin in barium titanate stannate is outside the specified hereinbefore, the resultant ceramic dielectric has a large variation of relative permittivity at around 100° C., and as results, it has no flat relative permittivity over a temperature range of −55° C. to +125° C, but also the dielectric has a low relative permittivity.

TABLE 12

(Example 12)

|  | No. | Compositions[1] | | | Sintering Density (g/cm³) | Properties of Ceramic Dielectrics | | |
|---|---|---|---|---|---|---|---|---|
|  |  | x in BaTi$_{1-x}$Sn$_x$O$_3$ | Ta$_2$O$_5$ (mole %) | CoO |  | Relative Permittivity[2] | Dielectric Loss Tangent[3] (%) | Resistivity (Ω · cm) |
| Reference | 7 | 0.01 | 1.1 | 0.5 | 5.71 | 4020 | 0.9 | 2.1 × 10$^{12}$ |
| Invention | 8 | 0.04 | 1.1 | 0.5 | 5.70 | 3760 | 1.1 | 3.3 × 10$^{12}$ |
|  | 9 | 0.07 | 1.1 | 0.5 | 5.67 | 3800 | 1.1 | 1.6 × 10$^{12}$ |

TABLE 12-continued (Example 12)

| | | Compositions[1] | | | Properties of Ceramic Dielectrics | | | |
| --- | --- | --- | --- | --- | --- | --- | --- | --- |
| | | | | | Sintering | | Dielectric Loss | |
| | No. | x in BaTi$_{1-x}$Sn$_x$O$_3$ | Ta$_2$O$_5$ (mole %) | CoO | Density (g/cm$^3$) | Relative Permittivity[2] | Tangent[3] (%) | Resistivity ($\Omega \cdot$ cm) |
| Reference | 10 | 0.12 | 1.1 | 0.5 | 5.66 | 3110 | 1.1 | 1.1 × 10$^{12}$ |

Notes:
[1] The compositions were composed of 80 mole % of BaTiO$_3$, 20 mole % of BaTi$_{1-x}$Sn$_x$O$_3$, and Ta$_2$O$_5$ and CoO in amounts as shown in the Table.
[2] 20° C., 1 KHz
[3] 20° C., 1 KHz

Example 13

An amount of 80 mole % of high purity barium titanate (BaTiO$_3$) of 0.6 μm in average particle size and 20 mole % of high purity barium titanate stannate solid solution (BaTi$_{0.95}$Sn$_{0.05}$O$_3$) of 0.6 μm in average particle size were mixed together with nickel oxide (NiO), manganese oxide (MgO) and niobium oxide (Nb$_2$O$_5$) in amounts shown in the Table 13, respectively, to prepare a composition.

Figure 13:
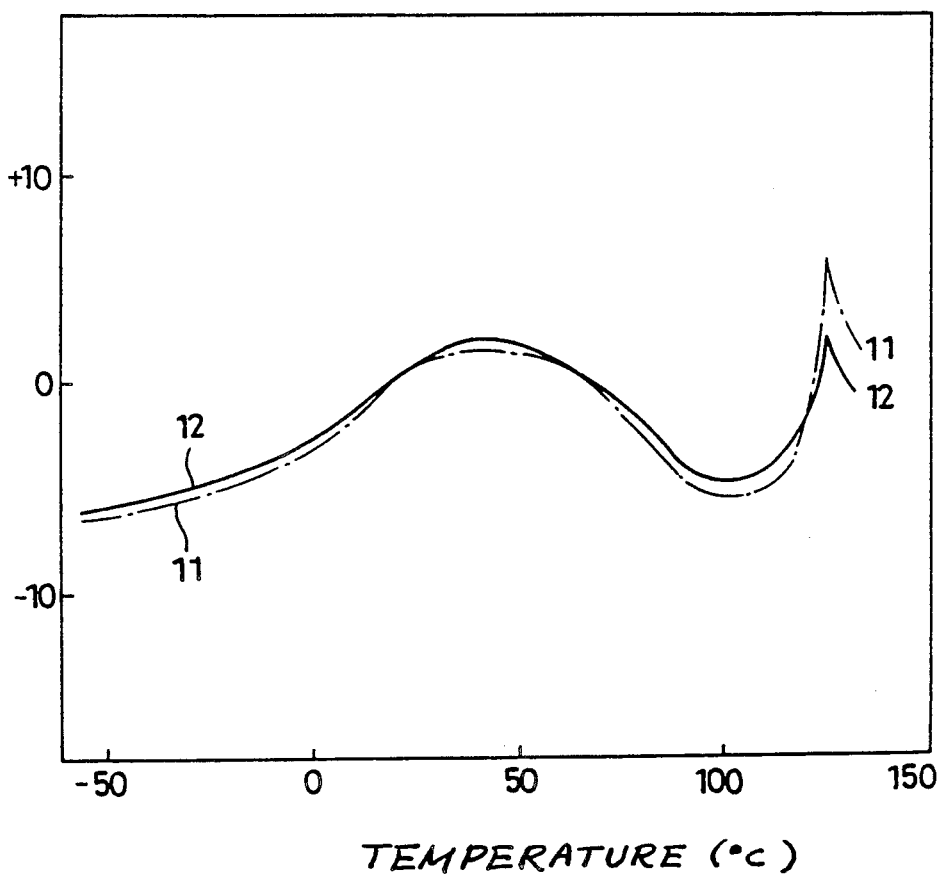

Ceramic dielectrics were produced in the same manner as in Example 1 using the composition. The electrical properties of the dielectrics are shown in the Table 13 and FIG. 13.

The results illustrate that the composition of the invention is readily sintered to provide a ceramic dielectric which has a very small temperature dependence of relative permittivity.

Example 14

An amount of 80 mole % of high purity barium titanate (BaTiO$_3$) of 0.3 μm in average particle size and 20 mole % of high purity barium titanate stannate solid solution (BaTi$_{0.96}$Sn$_{0.04}$O$_3$) of 0.4 μm in average particle size were mixed together with cobaltous oxide (CoO), manganese carbonate (MnCO$_3$) and niobium oxide (Nb$_2$O$_5$) in amounts shown in the Table 14, respectively, to prepare a composition.

Ceramic dielectrics were produced in the same manner as in Example 1 using the composition. The electrical properties of the dielectrics are shown in the Table 14 and in the FIG. 14.

The composition of the invention is readily sintered to provide a ceramic dielectric of a very small temperature dependence of relative permittivity.

Example 15

An amount of 85 mole % of high purity barium titanate (BaTiO$_3$) of 0.8 μm in average particle size and 15 mole % of high purity barium titanate zirconate stannate solid solution (BaTi$_{0.94}$Sn$_{0.01}$Zr$_{0.05}$O$_3$) of 0.8 μm in average particle size were mixed together with cobaltous oxide (CoO) and niobium oxide (Nb$_2$O$_5$) in amounts shown in the Table 15, respectively, to prepare a composition.

The composition was molded into green pellets in the same manner as in Example 1, and then the green pellets were dried at 400° C. for three hours to burn out the polyvinyl alcohol as a binder. The green pellets were then sintered at 1280° C., 1330° C. and 1380° C., respectively, for three hours, to provide ceramic dielectrics. The electrical properties of the dielectrics are shown in the Table 15 and in the FIG. 15.

TABLE 13

(Example 13)

| | | Metal Oxides (mole %)[1] | | | Properties of Ceramic Dielectrics | | | |
| --- | --- | --- | --- | --- | --- | --- | --- | --- |
| | | | | | Sintering Density | Relative | Dielectric Loss Tangent[3] | Resistivity |
| | No. | NiO | MgO | Nb$_2$O$_5$ | (g/cm$^3$) | Permittivity[2] | (%) | ($\Omega \cdot$ cm) |
| Invention | 11 | 0.7 | — | 0.6 | 5.70 | 3810 | 1.1 | 2.3 × 10$^{12}$ |
| | 12 | — | 0.7 | 1.5 | 5.69 | 3780 | 1.0 | 1.6 × 10$^{12}$ |

Notes:
[1] The compositions were composed of 80 mole % of BaTiO$_3$, 20 mole % of BaTi$_{0.95}$Sn$_{0.05}$O$_3$, and NiO, MgO and Nb$_2$O$_5$ in amounts as shown in the Table.
[2] 20° C., 1 KHz
[3] 20° C., 1 KHz

TABLE 14

(Example 14)

| | | Metal Oxides (mole %)[1] | | | Properties of Ceramic Dielectrics | | | |
| --- | --- | --- | --- | --- | --- | --- | --- | --- |
| | | | | | Sintering Density | Relative | Dielectric Loss Tangent[3] | Resistivity |
| | No. | CoO | MnCO$_3$ | Nb$_2$O$_5$ | (g/cm$^3$) | Permittivity[2] | (%) | ($\Omega \cdot$ cm) |
| Invention | 13 | 0.5 | 0.2 | 0.8 | 5.68 | 3730 | 0.8 | 5.0 × 10$^{12}$ |
| | 14 | 0.6 | — | 0.8 | 5.70 | 3910 | 1.0 | 2.1 × 10$^{12}$ |
| | 15 | — | 0.6 | 1.0 | 5.72 | 3640 | 0.8 | 4.2 × 10$^{12}$ |

Notes:
[1] The compositions were composed of 80 mole % of BaTiO$_3$, 20 mole % of BaTi$_{0.95}$Sn$_{0.05}$O$_3$, and CoO, MnCO$_3$ and Nb$_2$O$_5$ in amounts as shown in the Table.
[2] 20° C., 1 KHz
[3] 20° C., 1 KHz

TABLE 15

(Example 15)

| | No. | Sintering Temperature (°C.) | Metal Oxides (mole %)[1] | | Properties of Ceramic Dielectrics | | | |
|---|---|---|---|---|---|---|---|---|
| | | | CoO | Nb$_2$O$_5$ | Sintering Density (g/cm$^3$) | Relative Permittivity[2] | Dielectric Loss Tangent[3] (%) | Resistivity (Ω · cm) |
| Invention | 16 | 1280 | 0.6 | 0.9 | 5.68 | 3800 | 1.1 | 8.8 × 10$^{12}$ |
| | 17 | 1330 | 0.6 | 0.9 | 5.75 | 3810 | 1.0 | 2.5 × 10$^{12}$ |
| | 18 | 1380 | 0.6 | 0.9 | 5.71 | 4000 | 1.0 | 2.3 × 10$^{12}$ |

Notes:
[1] The compositions were composed of 85 mole % of BaTiO$_3$, 15 mole % of BaTi$_{0.94}$Sn$_{0.01}$Zr$_{0.05}$O$_3$, and CoO and Nb$_2$O$_5$ in amounts as shown in the Table.
[2] 20° C., 1 KHz
[3] 20° C., 1 KHz The composition of the invention is readily sintered at any temperatures as above to provide a ceramic dielectric which has a very small temperature dependence of relative permittivity.

What is claimed is:

1. A composition for producing ceramic dielectrics which comprises: a mixture of barium titanate which has average particle size of 0.1–1.5 μm in amounts of 98–60 mole % and a perovskite structure barium titanate solid solution which has average particle size of 0.1–1.5 μm and a Curie temperature of 50°–115° C. in amounts of 2–40 mole %; and (A) at least one of niobium oxides and tantalum oxides in amounts of 0.3–2 moles % in relation to 100 mole % of the mixture; and
   (B) at least one of cobalt oxides, nickel oxides, magnesium oxides, manganese oxides, copper oxides and oxides of a rare earth metal in amounts of 0.1–2 mole % in relation to 100 mole % of the mixture.

2. A composition for producing ceramic dielectrics which comprises: a mixture of barium titanate which has average particle size of 0.1–1.5 μm in amounts of 98–60 mole % and a perovskite structure barium titanate solid solution which has average particle size of 0.1–1.5 μm and a Curie temperature of 50°–115° C. in amounts of 2–40 mole %;

the perovskite structure barium titanate solid solution being:
   (a) a barium titanate zirconate solid solution represented by the general formula (I):

$$BaTi_{1-x}Zr_xO_3$$

wherein x is a numeral defined as $0.02 \leq x \leq 0.15$, or
   (b) a barium strontium titanate solid solution represented by the general formula (II):

$$Ba_{1-y}Sr_yTiO_3$$

wherein y is a numeral defined as $0.03 \leq y \leq 0.20$, or
   (c) a barium titanate stannate solid solution represented by the general formula (III):

$$BaTi_{1-z}Sn_zO_3$$

wherein z is a numeral defined as $0.01 \leq z \leq 0.10$,
   (d) a complex solid solution of two or more of the above solid solutions, or
   (e) a mixture of two or more of the above solid solutions, and;
   (A) at least one of niobium oxides and tantalum oxides in amounts of 0.3–2 moles % in relation to 100 mole % of the mixture; and
   (B) at least one of cobalt oxides, nickel oxides, magnesium oxides, manganese oxides, copper oxides and oxides of a rare earth metal in amounts of 0.1–2 mole % in relation to 100 mole % of the mixture.

3. A ceramic dielectric which produced by sintering a composition comprises: a mixture of barium titanate which has average particle size of 0.1–1.5 μm in amounts of 98–60 mole % and a perovskite type barium titanate solid solution which has average particle size of 0.1–1.5 μm and a Curie temperature of 50°–115° C. in amounts of 2–40 mole %;

the perovskite type barium titanate solid solution being:
   (a) a barium titanate zirconate solid solution represented by the general formula (I):

$$BaTi_{1-x}Zr_xO_3$$

wherein x is a numeral defined as $0.02 \leq x \leq 0.15$, or
   (b) a barium strontium titanate solid solution represented by the general formula (II):

$$Ba_{1-y}Sr_yTiO_3$$

wherein y is a numeral defined as $0.03 \leq y \leq 0.20$, or
   (c) a barium titanate stannate solid solution represented by the general formula (III):

$$BaTi_{1-z}Sn_zO_3$$

wherein z is a numeral defined as $0.01 \leq z \leq 0.10$,
   (d) a complex solid solution of two or more of the above solid solutions, or
   (e) a mixture of two or more of the above solid solutions, and;
   (A) at least one of niobium oxides and tantalum oxides in amounts of 0.3–2 moles % in relation to 100 mole % of the mixture; and
   (B) at least one of cobalt oxides, nickel oxides, magnesium oxides, manganese oxides, copper oxides and oxides of a rare earth metal in amounts of 0.1–2 mole % in relation to 100 mole % of the mixture.

4. A method of producing a ceramic dielectric which comprises: sintering a composition at temperatures of 1000°–1400° C., the composition comprising: a mixture of barium titanate which has average particle size of 0.1–1.5 μm in amounts of 98–60 mole % and a perovskite structure barium titanate solid solution which has average particle size of 0.1–1.5 μm and a Curie temperature of 50°–115° C. in amounts of 2–40 mole %;

the perovskite structure barium titanate solid solution being:
   (a) a barium titanate zirconate solid solution represented by the general formula (I):

$BaTi_{1-x}Zr_xO_3$ wherein x is a numeral defined as $0.02 \leqq x \leqq 0.15$, or
(b) a barium strontium titanate solid solution represented by the general formula (II):

$Ba_{1-y}Sr_yTiO_3$ wherein y is a numeral defined as $0.03 \leqq y \leqq 0.20$, or
(c) a barium titanate stannate solid solution represented by the general formula (III):

$BaTi_{1-z}Sn_zO_3$ wherein z is a numeral defined as $0.01 \leqq z \leqq 0.10$,
(d) a complex solid solution of two or more of the above solid solutions, or
(e) a mixture of two or more of the above solid solutions, and;
(A) at least one of niobium oxides and tantalum oxides in amounts of 0.3-2 moles % in relation to 100 mole % of the mixture; and
(B) at least one of cobalt oxides, nickel oxides, magnesium oxides, manganese oxides, copper oxides and oxides of a rare earth metal in amounts of 0.1-2 mole % in relation to 100 mole % of the mixture.

* * * * *